(12) United States Patent
Ischdonat et al.

(10) Patent No.: US 7,032,320 B2
(45) Date of Patent: Apr. 25, 2006

(54) MEASURING APPARATUS IN A PAPER MACHINE

(75) Inventors: Thomas Ischdonat, Bachhagel (DE); Ralf Pfifferling, Gerstetten (DE); Rudolf Muench, Koenigsbronn (DE); Michael Sollinger, Stuttgart (DE)

(73) Assignee: Voith Paper Patent GmbH, Heidenheim (DE)

( * ) Notice: Subject to any disclaimer, the term of this patent is extended or adjusted under 35 U.S.C. 154(b) by 0 days.

(21) Appl. No.: 10/942,375

(22) Filed: Sep. 16, 2004

(65) Prior Publication Data

US 2005/0144798 A1 Jul. 7, 2005

(30) Foreign Application Priority Data

Sep. 19, 2003 (DE) .............................. 103 43 515

(51) Int. Cl.
*G01B 3/00* (2006.01)
(52) U.S. Cl. ..................... 33/501.02; 33/733
(58) Field of Classification Search ............ 33/501.01, 33/501.02, 501.03, 732, 733; 73/159
See application file for complete search history.

(56) References Cited

U.S. PATENT DOCUMENTS

| | | | | |
|---|---|---|---|---|
| 2,659,182 A | * | 11/1953 | Argyle | 33/501.03 |
| 3,158,021 A | * | 11/1964 | Walters et al. | 73/159 |
| 3,352,022 A | * | 11/1967 | Fisk | 33/501.02 |
| 3,955,389 A | * | 5/1976 | Foster | 72/702 |
| 4,060,734 A | * | 11/1977 | Tilley et al. | 33/501.03 |
| 4,309,902 A | * | 1/1982 | Sano et al. | 73/159 |
| 4,936,140 A | * | 6/1990 | Houghton et al. | 73/159 |
| 4,957,770 A | * | 9/1990 | Howarth | 73/159 |
| 5,111,688 A | * | 5/1992 | Houghton et al. | 73/159 |
| 5,138,878 A | | 8/1992 | Cresson et al. | 73/159 |
| 5,212,982 A | * | 5/1993 | Macchiarulo et al. | 73/159 |
| 6,743,338 B1 | * | 6/2004 | Graeffe et al. | 73/159 |

FOREIGN PATENT DOCUMENTS

| | | |
|---|---|---|
| DE | 43 38 819 | 5/1995 |
| EP | 0018428 | 11/1980 |
| GB | 875508 | 8/1961 |

OTHER PUBLICATIONS

Google web page for: "define: cardan joint", printed Aug. 12, 2005.*

* cited by examiner

*Primary Examiner*—G. Bradley Bennett
(74) *Attorney, Agent, or Firm*—Taylor & Aust, P.C.

(57) ABSTRACT

A measuring apparatus includes at least one sensor which is provided on a measuring frame, which can be positioned opposite moving clothing or a device. The devices being, for example, a roll, of a machine for producing and/or treating a material web, in particular a paper or board web. The measuring frame is pressed against the clothing or device by at least one pivoting lever and is connected to the pivoting lever by a cardan joint.

23 Claims, 2 Drawing Sheets

MEASURING APPARATUS IN A PAPER MACHINE

BACKGROUND OF THE INVENTION

1. Field of the Invention

The present invention relates to a measuring apparatus, and more particularly to a measuring apparatus of a machine for producing and/or treating a fiber material web.

2. Description of the Related Art

Measuring apparatuses and measuring methods in which a sensor assumes an orthogonal alignment relative to the clothing entail extreme requirements with respect to alignment of the traverse opposite the clothing. Moreover, when such measuring apparatus and measuring methods are used, high requirements relative to the tolerance of the linear guidance have to be met.

What is needed in the art is a cost effective measuring apparatus.

SUMMARY OF THE INVENTION

The present invention is based on the object of providing an improved measuring apparatus in which the aforementioned disadvantages are eliminated. In this case, the intention is to overcome, in particular, inaccuracies in the previous linear guides, the clothing guide and the transverse alignment. In addition, a local tension measurement is possible on the clothing or device.

According to the present invention, this object is achieved by a measuring apparatus having at least one sensor, which is provided on a measuring frame, which can be positioned opposite moving clothing or a device. The device may be, for example, a roll, of a machine for producing and/or treating a material web, in particular a paper or board web, can be pressed against the clothing or device by at least one pivoting lever and is connected to this pivoting lever by a cardan joint.

On the basis of this construct, a considerably higher measurement accuracy is achieved. In addition, the measuring apparatus can now be implemented without linear guidance, that is to say only with rotary joints.

The cardan joint, preferably, has two axes of rotation perpendicular to each other. In this case, one axis of rotation of the cardan joint can extend generally transversely with respect to the running direction of the clothing or device, and its other axis of rotation can extend generally in the running direction of the clothing or device. The pivoting lever can expediently be pivoted about an axis extending generally transversely with respect to the running direction of the clothing or device.

The pivoting lever is acted on by at least one actuating element in order to press the measuring frame against the clothing or device. For this purpose, for example, at least one pneumatic and/or at least one hydraulic actuating element can be provided. The actuating element includes at least one piston/cylinder unit.

According to one embodiment of the measuring apparatus according to the present invention, the measuring frame extends transversely with respect to the running direction of the clothing or device. In this case, it extends, at least substantially, over the entire clothing width or width of the device. The sensor can be moved generally in the transverse direction relative to the measuring frame. In specific cases, it can also be advantageous if the sensor is moved generally in the running direction of the clothing or device relative to the measuring frame.

At its points of contact with the clothing or device, the measuring frame advantageously, in each case, has at least one sliding or rolling surface. Here, in particular, low-wear sliding or rolling surfaces are provided.

Advantageously, the measuring frame, pressed against the clothing or device, is supported on the clothing or device by the sliding or rolling surfaces such that the measuring plane lies at least substantially parallel to the clothing or device.

In one embodiment of the measuring apparatus according to the present invention, at its points of contact with the clothing or device, the measuring frame, in each case, has at least one running roller.

In another embodiment of the present invention, when the measuring frame is pressed against the clothing or device, the sensor touches the clothing or device.

In order to register the penetration depth with which the measuring frame presses against the clothing, or the sensor, assigned to said measuring frame, dips into the clothing, a displacement transducer, rotary encoder and/or the like is provided.

The pivoting lever is preferably designed as a two-armed lever. In this case, the measuring frame is expediently provided in the region of the free end of the lever arm facing the clothing or device, while the actuating element acts in the region of the free end of the other lever arm.

The moving clothing can be formed, for example, by a woven band, in particular a wire, and more particularly by a felt.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
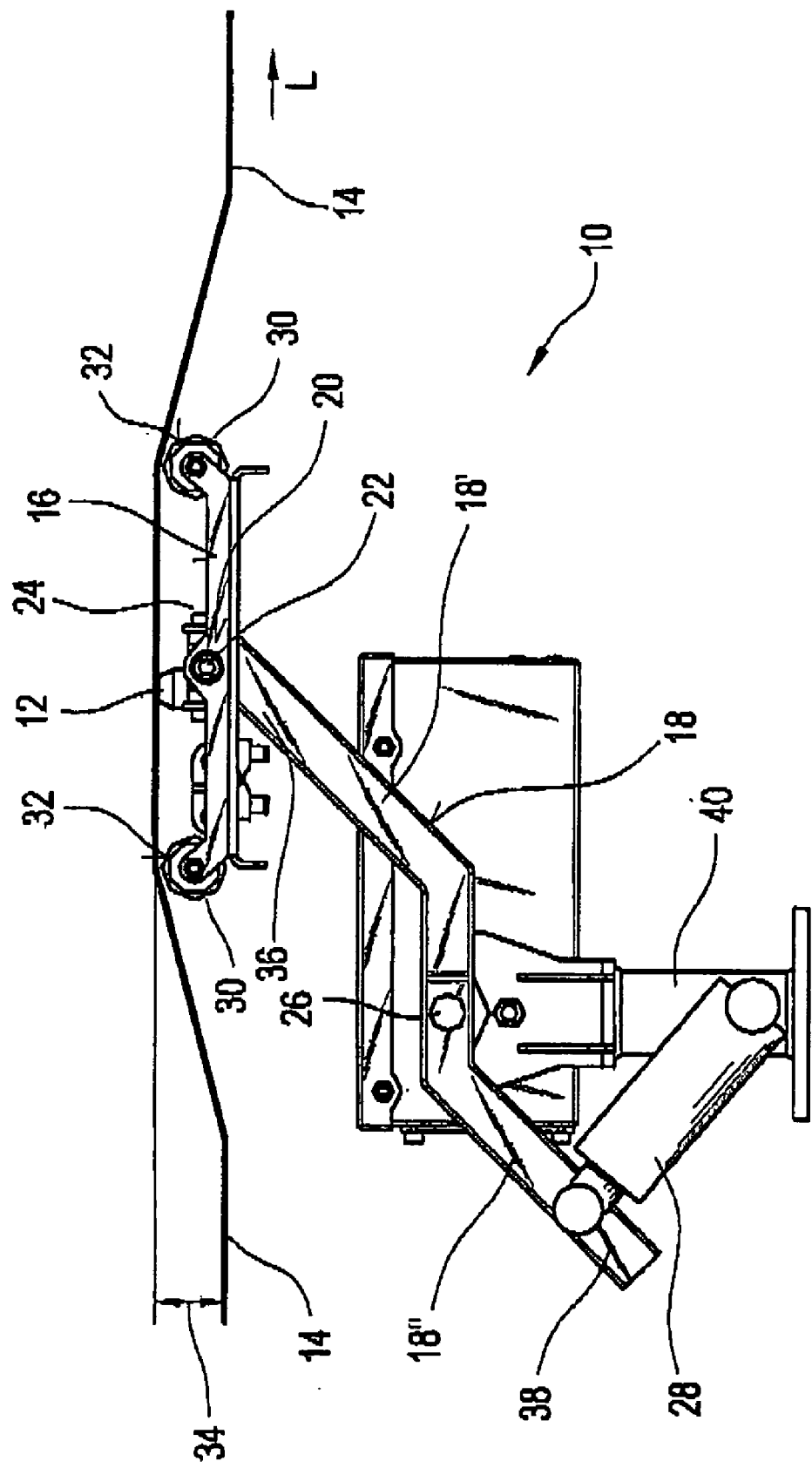
FIG. 1 is shows a schematic side view of one embodiment of a measuring apparatus having a measuring frame which can be pressed against clothing by at least one pivoting lever and to which at least one sensor is assigned of the present invention.

Referring now to the drawings, and more particularly to FIG. 1 there is shown a measuring apparatus 10 having at least one sensor 12 in a schematic side view. Sensor 12 is provided on a measuring frame 16 or traverse, which can be positioned opposite moving clothing 14 of a machine for producing and/or treating a fiber material web. The material web to be produced or to be treated by the relevant machine can be, in particular, a paper or board web.

Measuring frame 16 is positioned opposite moving clothing 14 and is pressed against the clothing 14 by at least one pivoting lever 18. In this case, measuring frame 16, that can be positioned opposite clothing 14 by pivoting arm 18 and pressed against the latter, is connected to pivoting lever 18 via a cardan joint 20.

Cardan joint 20 includes two axes of rotation 22 and 24 that are perpendicular to each other. Here, one axis of rotation 22 of cardan joint 20 can, in particular, extend generally transversely with respect to the running direction L of clothing 14 and its other axis of rotation 24 can extend generally in running direction L of clothing 14.

As can be seen in FIG. 1, pivoting lever 18 can be pivoted about an axis 26 extending generally transversely, with respect to the running direction L of the clothing 14. For this purpose, pivoting lever 18 can be acted on by at least one actuating element 28 in order to press measuring frame 16 against clothing 14. In this case, for example, at least one pneumatic and/or at least one hydraulic actuating element 28 can be provided. This can, in particular, be at least one piston/cylinder unit. In the case of the present embodiment, actuating element 28 is a pneumatic cylinder.

Measuring frame 16 can, in particular, extend transversely with respect to running direction L of clothing 14, preferably extending at least substantially over the entire clothing width or machine width. Sensor 12 can be moved generally in the transverse direction relative to measuring frame 16. It can also be moved generally in running direction L of clothing 14 relative to measuring frame 16.

At its points of contact with clothing 14, measuring frame 16 has at least one sliding or rolling surface 30, it being possible for low-wear sliding or rolling surfaces 30 to be provided. Measuring frame 16, pressed against clothing 14, is supported on clothing 14 by sliding or rolling surfaces 30 such that the measuring plane, which results from appropriate movement of sensor 12, lies at least substantially parallel to clothing 14.

In the present embodiment, measuring frame 16 has at least one running roller 32 at its point of contact with clothing 14. As can be seen in FIG. 1, when measuring frame 16 is pressed against clothing 14, sensor 12 touches clothing 14.

The higher the force with which actuating element 28 presses measuring frame 16, the deeper measuring frame 16 dips into clothing 14. The force being exemplified by the envelope curve around all the sliding or rolling surfaces, against clothing 14, or the air pressure applied to actuating element 28, formed by a pneumatic cylinder. The resultant penetration depth is a measure of the local tension of clothing 14, formed, for example, by a woven band and in particular a wire or a felt. This local tension can vary over the clothing or machine width.

In order to register penetration depth 34, caused as measuring frame 16 is pressed against clothing 14 and dips into clothing 14, sensor 12 may take the form of a displacement transducer 12 or a rotary encoder (not shown) and/or the like is provided that is associated with pivoting lever 18 so as to measure penetration death 34.

Penetration depth 34 is a function of the tension occurring with respect to clothing 14 and the force exerted on pivoting lever 18 by actuating element 28 or the pressurized air pressure in actuating element 28, formed here by a pneumatic cylinder.

As can be seen in FIG. 1, pivoting lever 18 is designed as a two-armed lever. Measuring frame 16 is provided in the region of a free end 36 of lever arm 18' facing clothing 14, while the actuating element 28 preferably acts in the region of free end 38 of the another lever arm 18".

As can be seen from FIG. 1, actuating element 28 is attached at one end to a supporting element or upright 40 and at the other end in the region of free end 38 of lever arm 18". Pivoting lever 18 is acted on by actuating element 28 in such a way that measuring frame 16, provided with sensor 12, is pressed against clothing 14.

Figure 2:
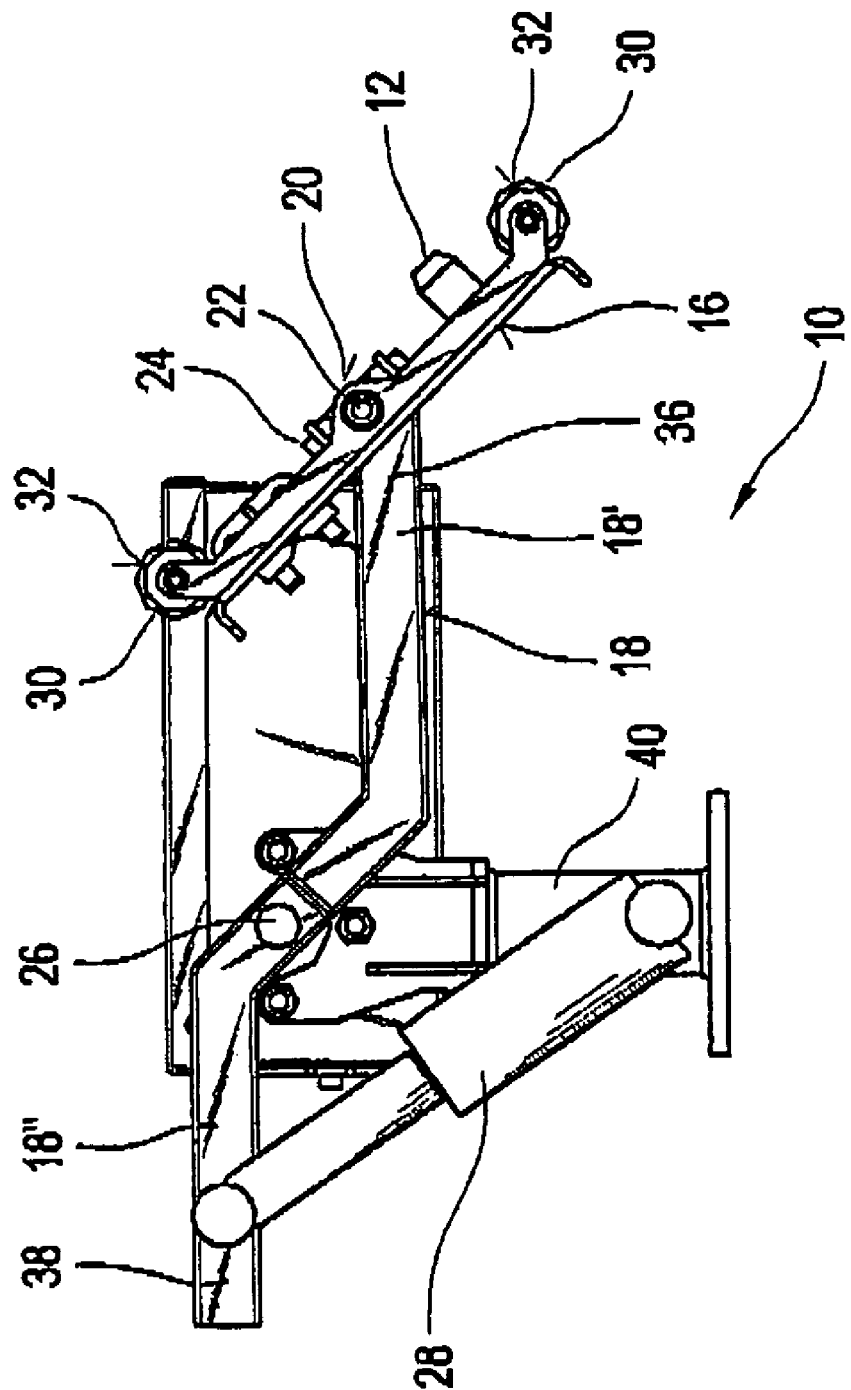
FIG. 2 is shows a schematic side view of the measuring apparatus according to FIG. 1 with the measuring frame pivoted away.

Now, additionally referring to FIG. 2, there is shown measuring apparatus 10 according to FIG. 1 in a schematic side view, with pivoting lever 18 pivoted in a clockwise direction. Lever arm 18', provided with measuring frame 16, is pivoted downward by way of acting appropriately on pivoting lever 18 via actuating element 28. Measuring frame 16 is therefore not in contact with clothing 14.

In FIGS. 1 and 2, mutually corresponding parts are assigned the same designations.

Instead of the moving clothing, a moving device, such as a roll or the like, can in principle also be provided.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF DESIGNATIONS

10 Measuring apparatus
12 Sensor
14 Clothing, woven band, felt
16 Measuring frame, traverse
18 Pivoting lever
18' Lever arm
18" Lever arm
20 Cardan joint
22 Axis of rotation
24 Axis of rotation
26 Pivot axis
28 Actuating element
30 Sliding or rolling surface
32 Running roller
34 Penetration depth
36 Free end
38 Free end
40 Supporting element, upright
L Running direction of the clothing

What is claimed is:

1. A measuring apparatus associated with a papermaking machine for one of producing and treating a fiber material web, comprising:
 a measuring frame positioned opposite one of moving clothing and a device;
 at least one sensor connected to said measuring frame;
 at least one pivoting lever; and
 a cardan joint coupling said at least one pivoting lever to said measuring frame, at least one of said measuring frame and said sensor being pressable against one of said moving clothing and said device.

2. The measuring apparatus of claim 1, wherein said cardan joint has a first axis of rotation and a second axis of rotation, said first axis being perpendicular to said second axis.

3. The measuring apparatus of claim 2, wherein one of said clothing and said device have a running direction, said first axis of rotation extends generally transversely to said running direction, said second axis extending generally in said running direction.

4. The measuring apparatus of claim 1, wherein one of said clothing and said device have a running direction, said pivoting lever is pivoted about an axis extending generally transversely to said running direction.

5. The measuring apparatus of claim 1, further comprising at lest one actuating element coupled to said pivoting lever so as to press said measuring frame against one of said clothing and said device.

6. The measuring apparatus of claim 5, wherein said actuating element is a pneumatic actuating element.

7. The measuring apparatus of claim 5, wherein said actuating element is a hydraulic actuating element.

8. The measuring apparatus of claim 5, wherein said actuating element is a piston/cylinder unit.

9. The measuring apparatus of claim 1, wherein said measuring frame extends transversely with respect to a running direction one of said clothing and said device.

10. The measuring apparatus of claim 9, wherein said clothing has a width, said measuring frame extending at least substantially across said width.

11. The measuring apparatus of claim 9, wherein said device has a width, said measuring frame extending at least substantially across said width.

12. The measuring apparatus of claim 10, wherein said at least one sensor is movable generally in a transverse direction relative to said measuring frame.

13. The measuring apparatus of claim 1, wherein one of said clothing and said device have a running direction, said at least one sensor being movable in said running direction.

14. The measuring apparatus of claim 1, wherein said measuring frame has at least one of a sliding surface and a rolling surface being in contact with said one of said clothing and said device.

15. The measuring apparatus of claim 14, wherein said sliding surface is a low-wear sliding surface and said rolling surface is a low-wear rolling surface.

16. The measuring apparatus of claim 14, wherein said measuring frame has a measuring plane that is substantially parallel to one of said clothing and said device when said measuring frame is pressed against one of said clothing and said device.

17. The measuring apparatus of claim 1, wherein said measuring frame includes at least one running roller being in contact with one of said clothing and said device.

18. The measuring apparatus of claim 1, wherein said at least one sensor touches one of said clothing and said device when said measuring frame is pressed against one of said clothing and said device.

19. The measuring apparatus of claim 1, further comprising one of a displacement transducer and a rotary encoder, said measuring frame pressing against one of said clothing and said device a distance defined as a penetration depth, one of said displacement transducer and said rotary encoder measuring said penetration depth.

20. The measuring apparatus of claim 1, wherein said at least one pivoting lever is a two-armed lever.

21. The measuring apparatus of claim 20, further comprising an actuating element, said at least one pivoting lever having a first end and a second end, said measuring frame being coupled to said first end and said actuating element being coupled to said second end.

22. The measuring apparatus of claim 1, wherein said moving clothing is one of a woven band and a wire.

23. The measuring apparatus of claim 1, wherein said moving clothing is a felt.

* * * * *

UNITED STATES PATENT AND TRADEMARK OFFICE
CERTIFICATE OF CORRECTION

PATENT NO. : 7,032,320 B2  Page 1 of 1
APPLICATION NO. : 10/942375
DATED : April 25, 2006
INVENTOR(S) : Ischdonat et al.

It is certified that error appears in the above-identified patent and that said Letters Patent is hereby corrected as shown below:

COLUMN 5
At line 27, please delete "10", and substitute therefore --9--.

Signed and Sealed this

Twenty-sixth Day of December, 2006

JON W. DUDAS
*Director of the United States Patent and Trademark Office*